United States Patent
Hawke et al.

(10) Patent No.: US 9,581,836 B2
(45) Date of Patent: *Feb. 28, 2017

(54) DYNAMIC STABILIZATION ZONES FOR CONTACT LENSES

(71) Applicant: Johnson & Johnson Vision Care, Inc., Jacksonville, FL (US)

(72) Inventors: Ryan Hawke, Vancouver, WA (US); Daniel B. Otts, Fruit Cove, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/331,437

(22) Filed: Jul. 15, 2014

(65) Prior Publication Data

US 2014/0320801 A1    Oct. 30, 2014

Related U.S. Application Data

(62) Division of application No. 13/372,309, filed on Feb. 13, 2012, now Pat. No. 8,814,350.

(51) Int. Cl.
  *G02C 7/04* (2006.01)
  *B29D 11/00* (2006.01)

(52) U.S. Cl.
  CPC ........ *G02C 7/048* (2013.01); *B29D 11/00048* (2013.01); *G02C 7/049* (2013.01)

(58) Field of Classification Search
  CPC ........ G02C 7/048; G02C 7/049; G02C 7/024; G02C 7/027; B29D 11/00038; B29D 11/00048

USPC ........... 351/159.19, 159.34, 159.36, 159.07, 351/159.21, 159.22, 159.38
See application file for complete search history.

(56) References Cited

U.S. PATENT DOCUMENTS

| | | |
|---|---|---|
| 4,477,158 A | 10/1984 | Pollock |
| 4,702,573 A | 10/1987 | Morstad |
| 5,108,169 A | 4/1992 | Mandell |
| 5,650,837 A | 7/1997 | Roffman |
| 6,183,082 B1 | 2/2001 | Clutterbuck |
| 6,939,005 B2 | 9/2005 | Jubin |
| 7,036,930 B2 | 5/2006 | Jubin |
| 7,159,979 B2 | 1/2007 | Jubin |
| 7,452,075 B2 | 11/2008 | Iuliano |
| 7,559,650 B2 | 7/2009 | Iuliano |

(Continued)

FOREIGN PATENT DOCUMENTS

| | | |
|---|---|---|
| CN | 1249442 A | 4/2000 |
| WO | WO2008115251 A1 | 9/2008 |

(Continued)

OTHER PUBLICATIONS

Effron, Nathan, "Contact Lens Practice Stabilization Techniques of Soft Toric Lenses", Butterworth Heinemann Elsevier, 2010, pp. 120-121.

*Primary Examiner* — Jordan Schwartz
(74) *Attorney, Agent, or Firm* — Carl J. Evens

(57) ABSTRACT

A contact lens incorporating one or more dynamic stabilization zones fabricated from a material that is readily deformable under eyelid pressure during blinking allows for the control over rotation of the contact lens on the eye. As the material deforms, the angle of contact between the eyelid and the one or more dynamic stabilization zones changes as does the rotational force acting on the contact lens.

1 Claim, 3 Drawing Sheets

(56) References Cited

U.S. PATENT DOCUMENTS

| | | | |
|---|---|---|---|
| 8,814,350 B2* | 8/2014 | Hawke | B29D 11/00048 |
| | | | 351/159.07 |
| 9,046,699 B2* | 6/2015 | Caldarise | A61F 9/0017 |
| 2002/0024631 A1* | 2/2002 | Roffman | G02C 7/04 |
| | | | 351/159.1 |
| 2005/0259220 A1 | 11/2005 | Neadle | |
| 2007/0153231 A1 | 7/2007 | Iuliano | |
| 2007/0247724 A1 | 10/2007 | Jung | |
| 2008/0097600 A1* | 4/2008 | Hare | A61F 2/1616 |
| | | | 623/6.37 |
| 2008/0231801 A1* | 9/2008 | Iuliano | G02C 7/085 |
| | | | 351/159.73 |
| 2009/0141235 A1* | 6/2009 | Collins | G02C 7/04 |
| | | | 351/159.79 |
| 2009/0213459 A1* | 8/2009 | Amirparviz | G02B 27/26 |
| | | | 359/465 |
| 2010/0020285 A1 | 1/2010 | Berge | |
| 2010/0245760 A1 | 9/2010 | Win-Hall | |
| 2012/0206692 A1* | 8/2012 | Yamaguchi | G02C 7/048 |
| | | | 351/159.05 |

FOREIGN PATENT DOCUMENTS

| | | | |
|---|---|---|---|
| WO | WO 2011-061790 A1 * | 5/2011 | |
| WO | WO2011061790 A1 | 5/2011 | |

* cited by examiner

DYNAMIC STABILIZATION ZONES FOR CONTACT LENSES

CROSS-REFERENCE TO RELATED APPLICATION

This application is a divisional of application Ser. No. 13/372,309, filed Feb. 13, 2012.

BACKGROUND OF THE INVENTION

1. Field of the Invention

The present invention relates to stabilization zones for contact lenses requiring rotational stability, such as toric contact lenses, and more particularly to contact lenses requiring rotational stability and incorporating one or more dynamic stabilization zones that have varying physical properties.

2. Discussion of the Related Art

Myopia or nearsightedness is an optical or refractive defect of the eye wherein rays of light from an image focus to a point before they reach the retina. Myopia generally occurs because the eyeball or globe is too long or the dome of the cornea is too steep. A minus powered spherical lens may be utilized to correct myopia. Hyperopia or farsightedness is an optical or refractive defect of the eye wherein rays of light from an image focus to a point after they reach or behind the retina. Hyperopia generally occurs because the eyeball or globe is too short or the dome of the cornea is too flat. A plus powered spherical lens may be utilized to correct hyperopia. Astigmatism is an optical or refractive defect in which an individual's vision is blurred due to the inability of the eye to focus a point object into a focused image on the retina. Unlike myopia and/or hyperopia, astigmatism has nothing do to with globe size or cornea steepness, but rather it is caused by an abnormal curvature of the cornea. A perfect cornea is spherical whereas in an individual with astigmatism, the cornea is not spherical. In other words, the cornea is actually more curved or steeper in one direction than another, thereby causing an image to be stretched out rather than focused to a point. A cylindrical lens rather than a spherical lens may be utilized to resolve astigmatism.

A toric lens is an optical element having two different powers in two orientations that are perpendicular to one another. Essentially, a toric lens has one power, spherical, for correcting myopia or hyperopia and one power, cylinder, for correcting astigmatism built into a single lens. These powers are created with curvatures at different angles which are preferably maintained relative to the eye. Toric lenses may be utilized in eyeglasses, intraocular lenses and contact lenses. The toric lenses used in eyeglasses and intraocular lenses are held fixed relative to the eye thereby always providing optimal vision correction. However, toric contact lenses may tend to rotate on the eye thereby temporarily providing sub-optimal vision correction. Accordingly, toric contact lenses also include a mechanism to keep the contact lens relatively stable on the eye when the wearer blinks or looks around.

It is known that correction of certain optical defects may be accomplished by imparting non-rotationally symmetric corrective characteristics to one or more surfaces of a contact lens such as cylindrical, bifocal, multifocal, wavefront corrective characteristics or decentration of the optical zone. It is also known that certain cosmetic features such as print patterns, markings, and the like are required to be placed in a specific orientation relative to the wearer's eye. The use of contact lenses is problematic in that each contact lens of the pair must be maintained at a specific orientation while on the eye to be effective. When the contact lens is first placed on-eye, it must automatically position, or auto-position, itself and then maintain that position over time. However, once the contact lens is positioned, it tends to rotate on the eye due to the force exerted on the contact lens by the eyelids during blinking as well as eyelid and tear film movement.

Maintenance of the on-eye orientation of a contact lens typically is accomplished by altering the mechanical characteristics of the contact lens. For example, prism stabilization, including decentering of the contact lens' front surface relative to the back surface, thickening of the inferior contact lens periphery, forming depressions or elevations on the contact lens' surface, and truncating the contact lens edge, are all methods that have been utilized.

Additionally, static stabilization has been used in which the contact lens is stabilized by the use of thick and thin zones, or areas in which the thickness of the contact lens' periphery is increased or reduced, as the case may be. Typically, the thick and thin zones are located in the contact lens' periphery with symmetry about the vertical and/or horizontal axes. For example, each of two thick zones may be positioned on either side of the optic zone and centered along the 0-180 degree axis of the contact lens. In another example, a single thick zone positioned at the bottom of the contact lens providing a similar weight effect, like that of prism stabilization, but also incorporating a region of increasing thickness from top to bottom in order to utilize upper eyelid forces to stabilize the contact lens may be designed.

The challenge with static stabilization zones is a tradeoff between contact lens stability and comfort, plus the physical limitations associated with increased thickness. With a static stabilization zone, the slope of the stabilization zone is fixed in the contact lens. Changes to the design to improve rotational speed, such as increasing the surface slope of the stabilization zone, also increases contact lens thickness and may adversely impact comfort. Additionally, the contact lens design has to accomplish two things; namely, to rotate to the proper orientation on insertion, and to maintain that orientation through the wear period. A static design requires tradeoffs in performance between these two modes.

Accordingly, it would be advantageous to design a contact lens with dynamic stabilization zones that auto-position the contact lens quickly and hold and/or maintain the desired position for optimal visual acuity regardless of eye movement, blinking and tears.

SUMMARY OF THE INVENTION

The varying property dynamic stabilization zone contact lens of the present invention overcomes a number of disadvantages associated with orientating and maintaining the orientation of contact lenses on a wearer's eye.

In accordance with one aspect, the present invention is directed to an ophthalmic device. The ophthalmic device comprising a contact lens requiring rotational stability on eye, the contact lens being formed from a lens material, and at least one dynamic stabilization zone incorporated into the contact lens, the at least one dynamic stabilization zone being configured to facilitate alignment, via rotation, of the contact lens on the eye at a rotational angle for optimal visual acuity and comprising a deformable material at eye temperature, and wherein the eyelids make an angle of contact with the at least one dynamic stabilization zone that changes when the eyelids move across the at least one dynamic stabilization zone.

In accordance with another aspect, the present invention is directed to a method for making an ophthalmic device. The method comprising forming a contact lens requiring rotational stability on eye, and incorporating at least one dynamic stabilization zone into the contact lens, the at least one dynamic stabilization zone facilitating alignment, via rotation, of the contact lens on the eye at a rotational angle for optimal visual acuity.

Contact lenses requiring rotational stabilization in order to maintain optimal visual acuity, for example, toric contact lenses currently rely on weight and/or eyelid pressure to maintain the contact lens in the correct position on the eye. The present invention is directed to a contact lens comprising one or more dynamic stabilization zones rather than one or more static stabilization zones. The one or more dynamic stabilization zones may be filled with or fabricated from a material that has varying physical properties. More specifically, the one or more dynamic stabilization zones may be fabricated from a material that is readily deformable under the pressure of eyelid movement. With one or more dynamic stabilization zones in accordance with the present invention, as the eyelids move, the slope of the contact area between the eyelids and the stabilization zone changes, thereby providing for more rapid rotational adjustment of the contact lens on the eye. In addition, as the eyelids converge into full blink position, the material forming the one or more dynamic stabilization zones redistributes and the entire dynamic stabilization zone flattens out thereby providing additional comfort.

Contact lenses in accordance with the present invention may comprise one or more dynamic stabilization zones. These one or more dynamic stabilization zones may comprise any suitable configuration and may be positioned at any suitable location on the contact lens to meet any number of design requirements. The contact lenses incorporating the one or more dynamic stabilization zones utilize the applied force from eyelid movement to change the shape of the one or more dynamic stabilization zones, which in turn provides another design parameter to improve rotational speed and contact lens rotational stability.

The contact lens incorporating one or more dynamic stabilization zones in accordance with the present invention provides for improved auto-positioning, improved rotational speed, improved contact lens rotational stability and improved comfort. The contact lens incorporating one or more dynamic stabilization zones is relatively simple to design and manufacture. The contact lens incorporating one or more dynamic stabilization zones is also relatively inexpensive to manufacture as compared to currently manufactured contact lenses. In other words, the incorporation of dynamic stabilization zones does not require a significant increase in manufacturing cost.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1:
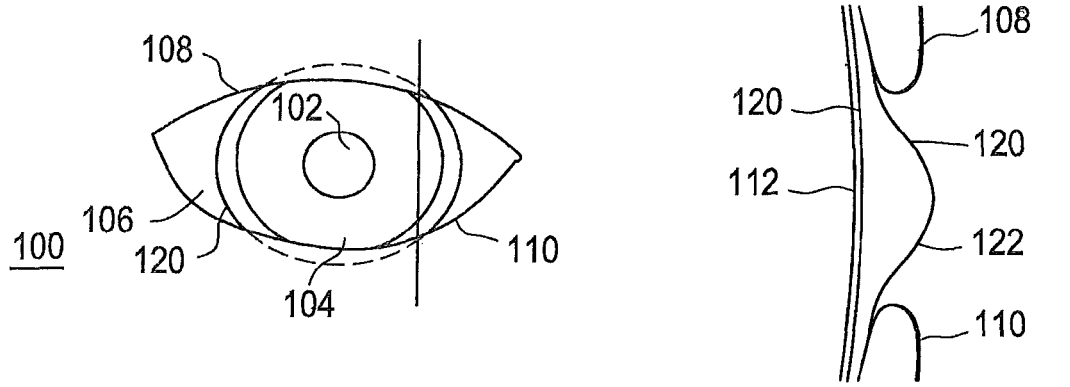
FIG. 1 is a diagrammatic representation of a prior art contact lens having an eyelid stabilized design feature in planar and cross sectional views.

Currently, contact lenses requiring rotational stabilization in order to maintain optimal visual acuity, for example, toric contact lenses, rely on either weight or eyelid pressure to maintain the contact lens oriented on the eye. Referring to FIG. 1, there is illustrated in both plan and cross-sectional view an eyelid pressure stabilized design wherein the contact lens 120 is thicker in a stabilization zone or region 122. The contact lens 120 is positioned on the eye 100 such that it covers the pupil 102, the iris 104 and a portion of the sclera 106 and sits under both the upper and lower eyelids 108 and 110 respectively. The thicker stabilization zone 122 in this design is positioned over the cornea 112. Once stabilized, the stabilization zone 122 is maintained between the upper and lower eyelids 108 and 110.

Figure 2:
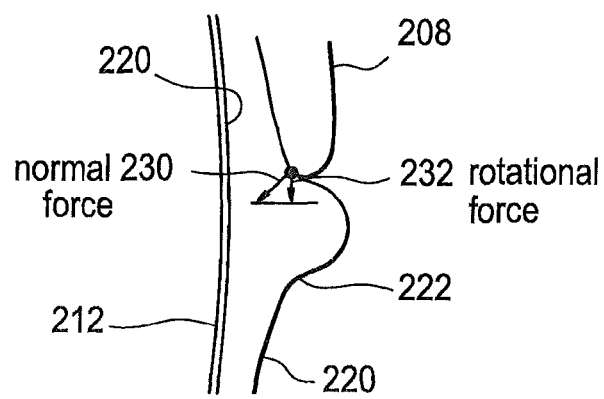
FIG. 2 is a detailed diagrammatic representation of the interaction zone between the upper eyelid and the contact lens of FIG. 1.

FIG. 2 illustrates in greater detail how the thicker stabilization zone 222 interacts with the upper eyelid 108 to induce a force that tends to rotate the contact lens 220. The critical parameter driving this rotational force is the angle of the contact area between the upper eyelid 208 and the stabilization zone 222 of the contact lens 220. As illustrated, the normal force, represented by vector 230, at a point of contact between the upper eyelid 208 and the periphery of the thicker stabilization zone 222 may be resolved into a rotational force, represented by vector 232. The steeper the angle of the stabilization zone 222, the greater the rotational force component of the normal force acting on the contact lens 220. Conversely, the lower or flatter the angle of the stabilization zone 222, the lower the rotational force component of the normal force acting on the contact lens 220.

In accordance with the present invention, the dynamic stabilization zone or zones may preferably be filled with a substance that may redistribute when pressure is applied. Essentially, the present invention is directed to a contact lens incorporating one or more dynamic stabilization zones that comprise a material that create one or more dynamic stabilization zones having varying physical properties. In one exemplary embodiment, as is described in greater detail subsequently, the contact lens comprises one or more fluid or gel filled cavities forming dynamic stabilization zones.

When the force or pressure from the eyelids compresses the edge of the one or more dynamic stabilization zones, the fluid or gel preferably redistributes with the cavity or cavities, thereby causing the one or more dynamic stabilization zones to change shape. More specifically, the increased pressure from the eyelids causes the local shape of the one or more stabilization zones at the eyelid contact point to increase thereby causing a larger rotational force than with a fixed shape stabilization zone or zones. As the eyelid movement continues, for example during a blink, this change in shape will result in a steepening of the angle of contact and thereby deliver more rotational force to the contact lens. In other words, as the eyelids continue to pass over the one or more dynamic stabilization zones, the fluid or gel continues to redistribute and the surface slopes continue to change. It may be possible with advanced modeling techniques to design dynamic stabilization zone(s) that provides both improved rotational speed upon insertion (auto-positioning) and increased stability of the contact lens when it is in position.

Figure 3A:
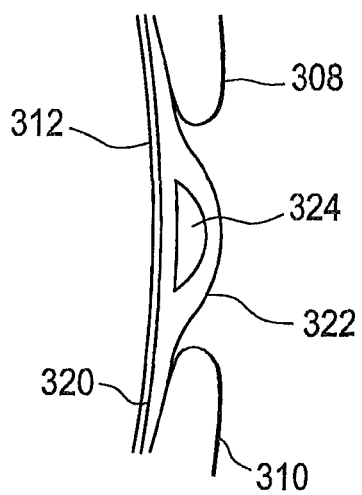
FIGS. 3A, 3B and 3C are diagrammatic representations of the progressive change in shape of a dynamic stabilization zone as a function of eyelid movement in accordance with the present invention.
Figure 3B:
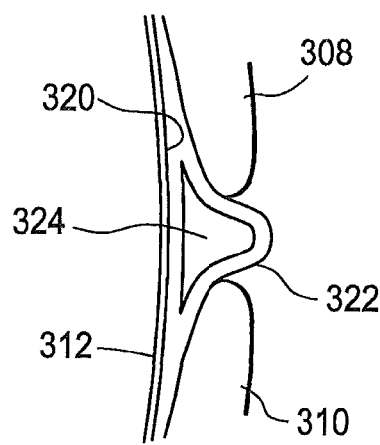
Figure 3C:
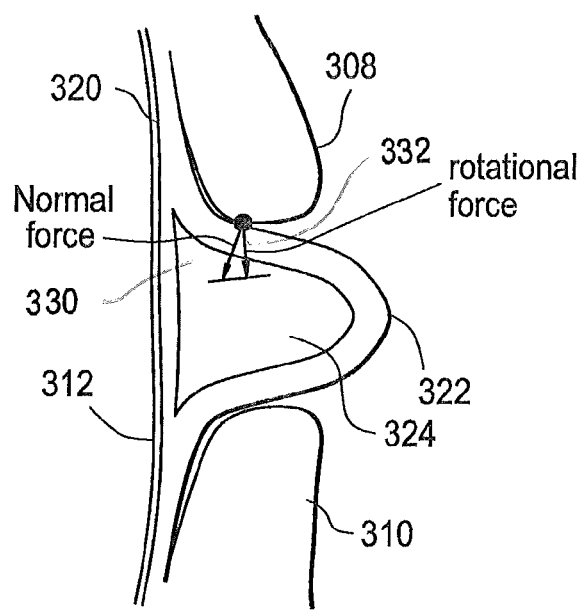

Referring to FIGS. 3A, 3B and 3C, there is illustrated the change in shape of a single dynamic stabilization zone as a function of eyelid movement over the contact lens. Although one or more dynamic stabilization zones may be utilized in a single contact lens, for ease of explanation only a single dynamic stabilization zone is described. FIG. 3A illustrates the position of the dynamic stabilization zone 322 of the contact lens 320 prior to blinking or eyelid movement. As illustrated, the eyelids 308 and 310 are positioned over the contact lens 320, but are not in contact with the dynamic stabilization zone 322 and thus have not caused any redistribution of the fluid or gel 324 within the cavity defining the dynamic stabilization zone 322. FIG. 3B illustrates the altered position (steeper angle) of the dynamic stabilization zone 322 during a blink. As the eyelids 308 and 310 converge, the pressure therefrom causes the fluid or gel 324 in the cavity defining the dynamic stabilization zone 322 to redistribute, thereby increasing the angle of the dynamic stabilization zone 322. FIG. 3C illustrates the further altered position of the dynamic stabilization zone 322 as the eyelids 308 and 310 continue to converge during blinking. As may be readily discerned from FIG. 3C, the steeper the angle of the dynamic stabilization zone 322, the closer the rotational force represented by vector 332 comes to the normal force represented by vector 330 which in turn indicates a greater proportion of the normal force is translated or resolved to rotational force acting on the contact lens 320.

Figure 4:
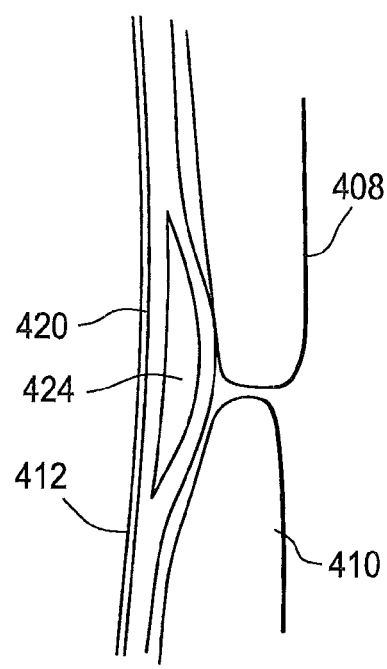
FIG. 4 is a diagrammatic representation of the dynamic stabilization zone with the upper and lower eyelids in full blink position in accordance with the present invention.

In addition to better rotational stability of the contact lens due to increased rotational force imparted by the eyelids, the dynamic stabilization zone design of the present invention preferably increases wearer comfort. Referring to FIG. 4, as full blink is achieved and the eyelids 408 and 410 pass over substantially the entire dynamic stabilization zone 422, the fluid or gel 424 within the cavity defining the dynamic stabilization zone 422 will once again redistribute due to the pressure exerted by the eyelids 408 and 410 into a flatter configuration. This flatter configuration allows the eyelids 408 and 410 to pass over the contact lens 420 with less downwardly directed force on the eye since the maximum thickness has been reduced due to the redistribution. Fixed stabilization zones do not thin out and thus may be less comfortable due to increased interaction with the eyelids passing over the contact lens.

As set forth herein, the contact lens of the present invention may comprise one or more dynamic stabilization zones. These one or more dynamic stabilization zones may comprise any suitable configuration and may be positioned at any suitable location on the contact lens to meet any number of design requirements. It is important to note, however, that in configuring any design that the upper and lower eyelids do not move strictly in a vertical direction, with an up down stroke during blinking. The upper eyelid moves substantially vertically, with a small nasal component during blinking, and the lower eyelid moves substantially horizontally, moving nasal ward during blinking with only a slight or small vertical movement. Additionally, the upper and lower eyelids are not symmetrical with respect to a plane cutting though the vertical meridian. In other words, individuals do not blink symmetrically relative to a horizontal axis drawn between the open upper and lower lid. Also, it is known that the eyes converge when the viewer gazes down.

Figure 5:
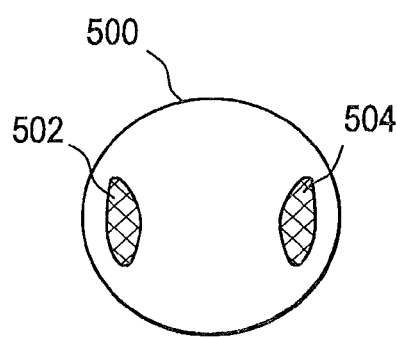
FIG. 5 is a diagrammatic representation of a first exemplary contact lens in accordance with the present invention.
Figure 6:
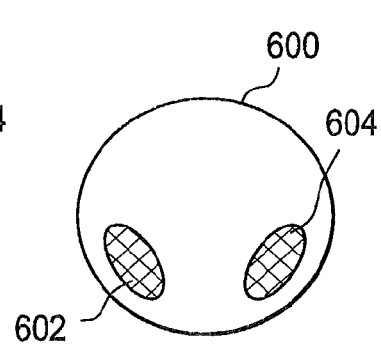
FIG. 6 is a diagrammatic representation of a second exemplary contact lens in accordance with the present invention.
Figure 7:
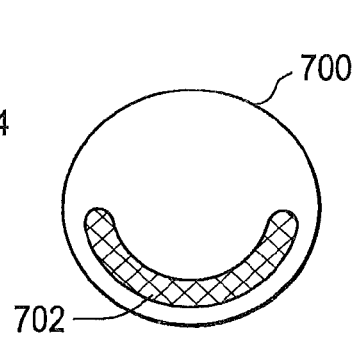
FIG. 7 is a diagrammatic representation of a third exemplary contact lens in accordance with the present invention.

FIG. 5 illustrates an exemplary embodiment of a contact lens 500 comprising two dynamic stabilization zones 502 and 504. In this exemplary embodiment, the fluid or gel filled cavities forming the dynamic stabilization zone 502 and 504 are positioned symmetrically about the horizontal axis of the contact lens 500 and about one hundred eighty degrees apart from one another. FIG. 6 illustrates another exemplary embodiment of a contact lens 600 also comprising two dynamic stabilization zones 602 and 604. In this exemplary embodiment, the fluid or gel filled cavities forming the dynamic stabilization zones 602 and 604 are shifted downwardly off the horizontal axis of the contact lens 600 and less than one hundred eighty degrees apart from one another as measured below the horizontal axis. This configuration utilizes gravity in combination with eyelid pressure to orient and maintain orientation of the contact lens 600 on the eye. FIG. 7 illustrates yet another exemplary embodiment of a contact lens 700 comprising a single dynamic stabilization zone 702. In this exemplary embodiment, the fluid or gel filled cavity forming the single dynamic stabilization zone 702 is formed in the lower region of the contact lens 700 such that gravity as well as eyelid pressure and/or eyelid movement operates on the contact lens 700 similarly to a prism ballast contact lens.

While each of these exemplary embodiments may be utilized in accordance with the present invention, it is important to note that any number of dynamic stabilization zone configurations may be utilized as long as the dynamic stabilization zones contain or are fabricated from a moveable or flowable material that changes shape when the eyelid passes over the dynamic stabilization zone, and their shape and placement are determined by taking into account eyelid movement as briefly described above. Non-symmetric designs, different designs for the left and right eyes, or custom stabilization designs for a given eye are possible with the dynamic stabilization zones of the present invention. In addition, custom contact lenses, for example, contact lenses fabricated directly from eye measurements, may incorporate dynamic stabilization zones in accordance with the present invention. Independent of the configuration, shape and placement of the dynamic stabilization zones on the contact lens is the ability of the material forming these or within these dynamic stabilization zones to redistribute itself under the pressure of eyelid movement that makes the present invention work.

The material or materials utilized to form a dynamic stabilization zone may comprise any suitable biocompatible material or materials that offer the desired mechanical properties. The material or materials should preferably be readily deformable under the pressure of eyelid movement as well as oxygen permeable or transmissive so that the one or more dynamic stabilization zones on a contact lens do not interfere with the eye receiving needed oxygen. The one or more dynamic stabilization zones in accordance with the present invention may be incorporated into any number of contact lenses, including those formed from silicone hydrogels, as long as the material or materials forming the one or more dynamic stabilization zones is both chemically and physically compatible with the material or materials forming the contact lens. With respect to physical compatibility, the material or materials forming the contact lens preferably does not allow the material or materials forming a dynamic stabilization zone, for example, a fluid or gel, to permeate and/or otherwise diffuse or leak from the cavity formed in the contact lens to secure the dynamic stabilization zone. With respect to chemical compatibility, the material or materials forming a dynamic stabilization zone preferably does not react in any manner with the material or materials forming the contact lens and/or the eye. The material or materials forming a dynamic stabilization zone may be positioned or secured in a cavity and/or space formed in the correct region of the contact lens in any suitable manner as discussed in greater detail subsequently.

The material or materials forming a dynamic stabilization zone may comprise any suitable biocompatible and deformable material having a glass transition temperature of less than about thirty-four degrees C.

Silicone based materials for forming the one or more dynamic stabilization zones may be preferable in that silicone based materials, including silicone oils, have the desired mechanical properties or may be easily tailored to have the desired mechanical properties to enable the invention. Silicone based materials, including silicone oils, are also highly oxygen permeable. In addition, many soft contact lenses are formed from silicone based materials and as such would be compatible. Fluorosilicone based materials may also be utilized.

In alternate exemplary embodiments, the material or materials for forming the one or more dynamic stabilization zones may comprise the same material or materials forming the contact lens. In another alternate exemplary embodiment, the material or materials for forming the one or more dynamic stabilization zones may be in a solid, liquid or gas state. In yet another alternate exemplary embodiment, the material or materials for forming the one or more dynamic stabilization zones may be in one form or state during the manufacturing process and in another form or state when place on the eye. For example, the material or materials for forming the one or more dynamic stabilization zones may be solid or frozen during the manufacturing process and in liquid form thereafter. In still another alternate exemplary embodiment, the material or materials forming the one or more dynamic stabilization zones may be a self contained material or combination of materials that may be incorporated directly into a cavity of the contact lens or it may be a material or combination of materials that preferably have to be encapsulated or otherwise protected prior to being incorporated into a cavity of the contact lens.

Figure 8:
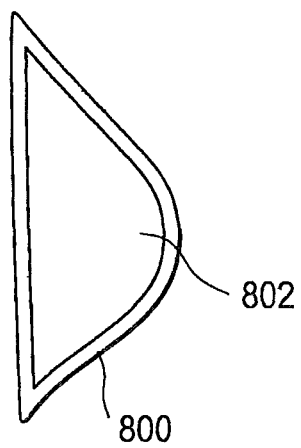
FIG. 8 is a diagrammatic representation of an exemplary dynamic zone capsule for a contact lens in accordance with the present invention.

As set forth above, the contact lens comprising one or more dynamic stabilization zones of the present invention may be manufactured utilizing any number of processes. In one exemplary embodiment, the one or more dynamic stabilization zones may be formed into capsules with a flexible outer material and pre-filled with the fluid or gel before being positioned in the contact lens. Some possible methods of manufacturing the capsules include welding, for example by heat or ultrasonically, two portions of film to form the top and bottom and injecting the fluid or gel before completing the seal around the edge. The film may comprise any suitable material, including those described above. FIG. 8 illustrates an exemplary embodiment of a capsule 800 with the fluid or gel 802 contained therein. The shape of the exemplary capsule 800 is arbitrary and only represents one possible design. A similar process, as set forth above, is to use a material for the one or more stabilization zones that may be positioned in the contact lens while frozen, but is liquid at eye temperatures. These pre-made fluid regions would preferably be placed into the contact lens molds with the contact lens raw material and bonded or encapsulated in the contact lens as the contact lens is cured.

In the exemplary embodiment wherein a space and/or cavity is created in the contact lens for the formation of a dynamic stabilization zone, the space and/or cavity may be created in a manner similar to that of the manufacture of a hybrid contact lens. For example, in this exemplary process, a liquid monomer predose is applied to a front curve and then the deformable material in the desired form is applied thereto. Once the deformable material is accurately positioned in the desired location, the monomer is pre-cured to a specified amount to facilitate release of the mechanical fixturing device while maintaining positional accuracy. Finally, the remainder of the monomer is added, the back curve positioned and the entire assembly is cured.

Figure 9:
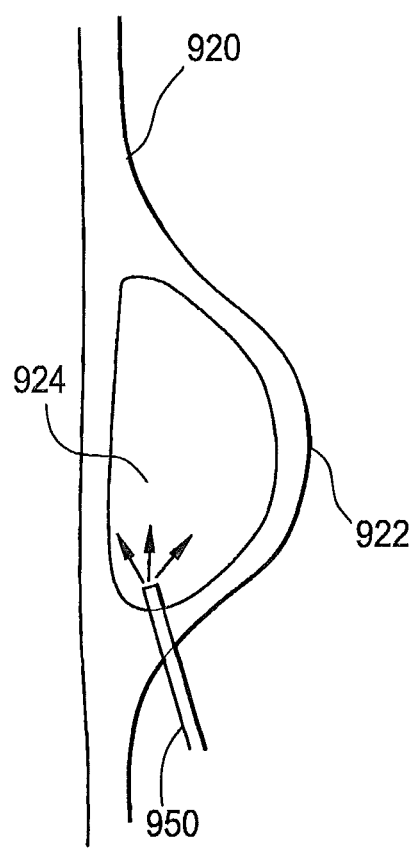
FIG. 9 is a diagrammatic representation of an exemplary process for fabricating a contact lens incorporating one or more dynamic stabilization zones in accordance with the present invention.

In accordance with another exemplary embodiment, the contact lens may be fabricated utilizing known processes then injected directly with the fluid or gel utilizing a needle or similar device. Essentially, the one or more dynamic stabilization zone cavities would be formed by injecting the material directly into the contact lens at the desired location(s). FIG. 9 illustrates a needle 950 inserted into the contact lens 920 to create a dynamic stabilization zone 922 with a fluid or gel 924 injected via the needle 950. Once the material is injected and the needle removed, the hole at the insertion site may be sealed. In one exemplary embodiment, the injection hole may be sealed as part of the curing process. For example, the injection of the material may be done before the contact lens is fully cured and final cure would take place after removing the needle, allowing the uncured material to close the hole and then cure it closed.

In accordance with yet another exemplary embodiment, a process wherein contact lens material may be cured from the outside in, and by controlled curing on both sides may be utilized to create a thick region of uncured or under-cured material, i.e. different cross-link density, may thus be trapped, thereby forming the one or more dynamic stabilization zones.

In accordance with yet another exemplary embodiment, a contact lens may be manufactured utilizing rotationally-symmetric contact lens molds, as if for a sphere product, while utilizing multiple curable formulations that, when cured, differ in their abilities to absorb water, in their elastic modulus, and in their monomer composition. For example, it is well-known to those of skill in the relevant art that curable contact lens formulations may be made more hydrophilic by way of incorporation of higher concentrations of monomers with greater affinity for water, for example, methacrylic acid. Furthermore, curable contact lens formulations may be adjusted to achieve a desired hydrated modulus by varying the amounts and/or types of crosslinking agents for example, ethylene glycol dimethacrylate.

In accordance with still another exemplary embodiment, one or more dynamic stabilization zones may be realized by pad printing certain patterns onto a front curve during the contact lens fabrication process. In one exemplary embodiment, a printable dynamic stabilization zone composition may be formulated to achieve relatively high equilibrium water content, for example, greater than sixty-five (65)

percent and/or a relatively low modulus, for example, less than seventy (70) psi. It is also known to those of skill in the relevant art that the expansion factor (defined herein by as-processed lens volume divided by as-cured lens volume) of a liquid curable monomer mixture may be adjusted by adding or subtracting non-reactive diluents. Specifically, by reducing the diluent level, the expansion factor is increased. By increasing the diluent level, the expansion factor is reduced. Useful curable compositions for printing dynamic stabilization zones could utilize curable monomer mixtures having a relatively low diluent level, thereby resulting in localized zones that will absorb more water and protrude from the front surface of the contact lens. With appropriate formulation of a low diluent content liquid curable monomer mixture to achieve relatively high equilibrium water content, a relatively low elastic modulus, and a suitable pad printing viscosity and volatility, a dynamic stabilization zone pattern may be printed onto a front surface contact lens mold having utility according to the present invention. When fully processed, a contact lens having such a feature would be comprised of at least two distinct curable monomer formulations. Furthermore, the resulting contact lens would have proud dynamic stabilization zones comprising hydrogel material that differs in composition, for example, water content, monomer content, and/or crosslink density, from the bulk of the contact lens. Accordingly, in such an exemplary embodiment, the one or more dynamic stabilization zones are not fluid-filled sacs, rather, they are discrete viscoelastic zones having tailored chemical and physical properties.

In the case where stabilization zones are pad printed onto a front curve with tailored curable liquid monomer mixtures, the composition of the mixture should be such that it will co-polymerize with the material that is used in the bulk of the contact lens. In this manner, the printed dynamic stabilization zone is chemically bonded to the bulk of the contact lens, and such zones are processable in a similar manner to the bulk material of the contact lens.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A method for making an ophthalmic device, the method comprising:
    forming a contact lens requiring rotational stability when on an eye, the contact lens being formed from a first material;
    forming one or more capsules with a flexible outer material and pre-filled with at least one of a fluid or gel; and
    incorporating one or more dynamic stabilization zones into the contact lens by forming one or more cavities in the contact lens and placing the one or more capsules in the one or more cavities such that they redistribute and change shape within the one or more cavities under eyelid pressure at eye temperature, the one or more dynamic stabilization zones form an angle of contact with the eyelids wherein the angle of contact between the one or more dynamic stabilization zones and the eyelids changes when the eyelids move across the one or more dynamic stabilization zones by changing the shape of the one or more capsules such that the angle of contact between the eyelids and the one or more dynamic stabilization zones increases during blinking thereby increasing the rotational force acting on the contact lens until the eyelids are substantially in contact with one another thereby flattening the one or more capsules comprising the one or more dynamic stabilization zones, the one or more dynamic stabilization zones being positioned in a predetermined location to achieve a desired result, the location being two independent dynamic stabilization zones shifted downward from a horizontal axis that passes through a center of the contact lens and less than 180 degrees apart from one another.

* * * * *